United States Patent
Sullivan et al.

[11] Patent Number: 5,368,304
[45] Date of Patent: Nov. 29, 1994

[54] LOW SPIN GOLF BALL

[75] Inventors: Michael J. Sullivan, Chicopee; R. Dennis Nesbitt, Westfield, both of Mass.

[73] Assignee: Lisco, Inc., Tampa, Fla.

[21] Appl. No.: 54,406

[22] Filed: Apr. 28, 1993

[51] Int. Cl.[5] .................. A63B 37/06; A63B 37/12
[52] U.S. Cl. ................... 273/220; 273/235 R
[58] Field of Search ........... 273/235 R, 235 A, 235 B, 273/230, 62, 228, 220, 218

[56] References Cited

U.S. PATENT DOCUMENTS

| | | | |
|---|---|---|---|
| 4,274,637 | 6/1981 | Molitor | 273/235 R |
| 4,726,590 | 2/1988 | Molitor | 273/220 |
| 4,884,814 | 12/1989 | Sullivan | 273/235 R |
| 4,986,545 | 1/1991 | Sullivan | 273/235 R |
| 5,098,105 | 3/1992 | Sullivan | 273/235 R |
| 5,120,791 | 6/1992 | Sullivan | 273/235 R X |
| 5,187,013 | 2/1993 | Sullivan | 273/235 R X |
| 5,209,485 | 5/1993 | Nesbitt et al. | 273/235 R X |

Primary Examiner—George J. Marlo

[57] ABSTRACT

The present invention is directed to a golf ball comprising a soft diene polymer core and a hard ionomer resin cover to produce a resulting molded golf ball having a reduced spin rate of not greater than 7643 revolutions per minute when struck with a No. 9 iron at a head speed of 105 feet per minute and a launch angle of 26 to 34 degrees rate. The golf ball of the present invention has an enlarged diameter which serves to further reduce spin rate. The resulting golf ball exhibits properties of reduced spin without sacrificing durability, playability and resilience. The core has a Riehle compression of at least 0.075, and the cover has a Shore D hardness of at least 65.

12 Claims, 1 Drawing Sheet

LOW SPIN GOLF BALL

FIELD OF THE INVENTION

The present invention relates to golf balls and, more particularly, to improved two-piece golf balls having low spin rates. The improvement in the golf balls results from a combination of a softened polybutadiene core and a hard cover made from blends of one or more specific hard, high stiffness ionomers. The combination of a soft core and a hard cover leads to an improved golf ball having a lower than anticipated spin rate while maintaining the resilience and durability characteristics necessary for repetitive play.

In an additional embodiment of the invention, the spin rate is further reduced by decreasing the weight of the softened polybutadiene core while maintaining core size and by increasing the thickness of the cover. The larger, less dense finished ball exhibits lower spin rates after club impact than conventional balls.

BACKGROUND OF THE INVENTION

Spin rate is an important golf ball characteristic for both the skilled and unskilled golfer. High spin rates allow for the more skilled golfer, such as PGA professionals and low handicap players, to maximize control of the golf ball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desirous by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golf ball, a more efficient ball for the less skilled player is a golf ball that exhibits low spin properties. The low spin ball reduces slicing and hooking and enhances roll distance for the amateur golfer.

The present inventors have addressed the need for developing a golf ball having a reduced spin rate after club impact, while at the same time maintaining durability, playability and resiliency characteristics needed for repeated use. The reduced spin rate golf ball of the present invention meets the rules and regulations established by the United States Golf Association (U.S.-G.A.).

Along these lines, the U.S.G.A. has set forth five (5) specific regulations that a golf ball must conform to. The U.S.G.A. rules require that a ball be no smaller than 1.680 inches in diameter. However, notwithstanding this restriction, there is no specific limitation as to the maximum permissible diameter of a golf ball. As a result, a golf ball can be as large as desired so long as it is larger than 1.680 inches in diameter and so long as the other four (4) specific regulations are met.

The U.S.G.A. rules also require that balls weigh no more than 1.620 ounces, and that their initial velocity may not exceed 250 feet per second with a maximum tolerance of 2%, or up to 255 ft./sec. Further, the U.S.-G.A. rules state that a ball may not travel a distance greater than 280 yards with a test tolerance of 6% when hit by the U.S.G.A. outdoor driving machine under specific conditions.

It has been determined by the present inventors that the combination of a relatively soft core (i.e. Riehle compression of about 0.075 to 0.115) and a hard cover (i.e. Shore D hardness of 65 or more) significantly reduces the overall spin rate of the resulting two piece golf ball. The inventors have also learned that an increase in cover thickness, thereby increasing the overall diameter of the resulting molded golf ball, further reduces spin rate.

Top-grade golf balls sold in the United States may be generally classified as one of two types: two-piece or three-piece balls. The two-piece ball, exemplified by the balls sold by Spalding & Evenflo Companies, Inc. (the assignee of the present invention through its wholly owned subsidiary, Lisco, Inc.) under the trademark TOP-FLITE, consists of a solid polymeric core and a separately formed outer cover. The so-called three-piece balls, exemplified by the balls sold under the trademark TITLEIST by the Acushnet Company, consist of a liquid (e.g., TITLEIST TOUR 384) or solid (e.g., TITLEIST DT) center, elastomeric thread windings about the center, and a cover.

Spalding's two-piece golf balls are produced by molding a natural (balata) or synthetic (i.e. thermoplastic resin such as an ionomer resin) polymeric cover composition around a preformed polybutadiene (rubber) core. During the molding process, the desired dimple pattern is molded into the cover material. In order to reduce the number of coating steps involved in the finishing of the golf balls, a color pigment or dye and, in many instances, an optical brightener, are added directly to the generally "off white" colored polymeric cover composition prior to molding. By incorporating the pigment and/or optical brightener in the cover composition molded onto the golf ball core, this process eliminates the need for a supplemented pigmented painting step in order to produce a white or colored (notably orange, pink and yellow) golf ball.

With respect to multi-layered golf balls, Spalding is the leading manufacturer of two-piece golf balls in the world. Spalding manufactures over sixty (60) different types of two-piece balls which vary distinctly in such properties as playability (i.e. spin rate, compression, feel, etc.), travel distance (initial velocity, C.O.R., etc.), durability (impact, cut and weather resistance) and appearance (i.e. whiteness, reflectance, yellowness, etc.) depending upon the ball's core, cover and coating materials, as well as the ball's surface configuration (i.e. dimple pattern). Consequently, Spalding's two-piece golf balls offer both the amateur and professional golfer a variety of performance characteristics to suit an individual's game.

In regard to the specific components of a golf ball, although the nature of the cover can, in certain instances, make a significant contribution to the overall feel, spin (control), coefficient of restitution (C.O.R.) and initial velocity of a ball (see, for example, U.S. Pat. No. 3,819,768 to Molitor), the initial velocity of two-piece and three-piece balls is determined mainly by the coefficient of restitution of the core. The coefficient of restitution of the core of wound (i.e. three-piece) balls can be controlled within limits by regulating the winding tension and the thread and center composition. With respect to two-piece balls, the coefficient of restitution of the core is a function of the properties of the elastomer composition from which it is made.

The cover component of a golf ball is particularly influential in effecting the compression (feel), spin rates (control), distance (C.O.R.), and durability (i.e. impact resistance, etc.) of the resulting ball. Various cover compositions have been developed by Spalding and others in order to optimize the desired properties of the resulting golf balls.

Over the last twenty (20) years, improvements in cover and core material formulations and changes in dimple patterns have more or less continually improved golf ball distance. Top-grade golf balls, however, must meet several other important design criteria. To successfully compete in today's golf ball market, a golf ball should be resistant to cutting and must be finished well; it should hold a line in putting and should have good click and feel. In addition, the ball should exhibit spin and control properties dictated by the skill and experience of the end user.

The present invention is directed to improved top-grade golf balls having reduced spin rates. The improved golf balls offer the less skilled golfer better control over his or her shots and allow for greater distance.

In an alternative embodiment, the spin rate of the ball is further reduced by increasing the thickness of the cover and/or decreasing the weight and softness of the core. By increasing the cover thickness and/or the overall diameter of the resulting molded golf ball, enhanced reduction in spin rate is observed.

With respect to the increased size of the ball, over the years golf ball manufacturers have generally produced golf balls at or around the minimum size and maximum weight specifications set forth by the U.S.G.A. There have, however, been exceptions, particularly in connection with the manufacture of golf balls for teaching aids. For example, oversized, overweight (and thus unauthorized) golf balls have been on sale for use as golf teaching aids (see U.S. Pat. No. 3,201,384 to Barber).

Oversized golf balls are also disclosed in New Zealand Patent 192,618 dated Jan. 1, 1980, issued to a predecessor of the present assignee. This patent teaches an oversize golf ball having a diameter between 1.700 and 1.730 inches and an oversized core of resilient material (i.e. about 1.585 to 1.595 inches in diameter) so as to increase the coefficient of restitution. Additionally, the patent discloses that the ball should include a cover having a thickness less than the cover thickness of conventional balls (i.e. a cover thickness of about 0.050 inches as opposed to 0.090 inches for conventional two-piece balls).

In addition, it is also noted that golf balls made by Spalding in 1915 were of a diameter ranging from 1.630 inches to 1.710 inches. As the diameter of the ball increased, the weight of the ball also increased. These balls were comprised of covers made up of balata/gutta percha and cores made from solid rubber or liquid sacs and wound with elastic thread.

Golf balls known as the LYNX JUMBO were also commercially available by Lynx in October, 1979. These balls had a diameter of 1.76 to 1.80 inches. It met with little or no commercial success. The LYNX JUMBO balls consisted of a core comprised of wound core and a cover comprised of natural or synthetic balata.

However, notwithstanding the enhanced diameters of these golf balls, none of these balls produced the enhanced spin reduction characteristics and overall playability, distance and durability properties of the present invention and/or fall within the regulations set forth by the U.S.G.A. An object of the present invention is to produce a U.S.G.A. regulation golf ball having improved low spin properties while maintaining the resilience and durability characteristics necessary for repetitive play.

These and other objects and features of the invention will be apparent from the following summary and description of the invention and from the claims.

BRIEF DESCRIPTION OF THE DRAWINGS

The following is a brief description of the drawings which are presented for the purposes of illustrating the invention and not for purposes of limiting the same.

SUMMARY OF THE INVENTION

Figure 1:
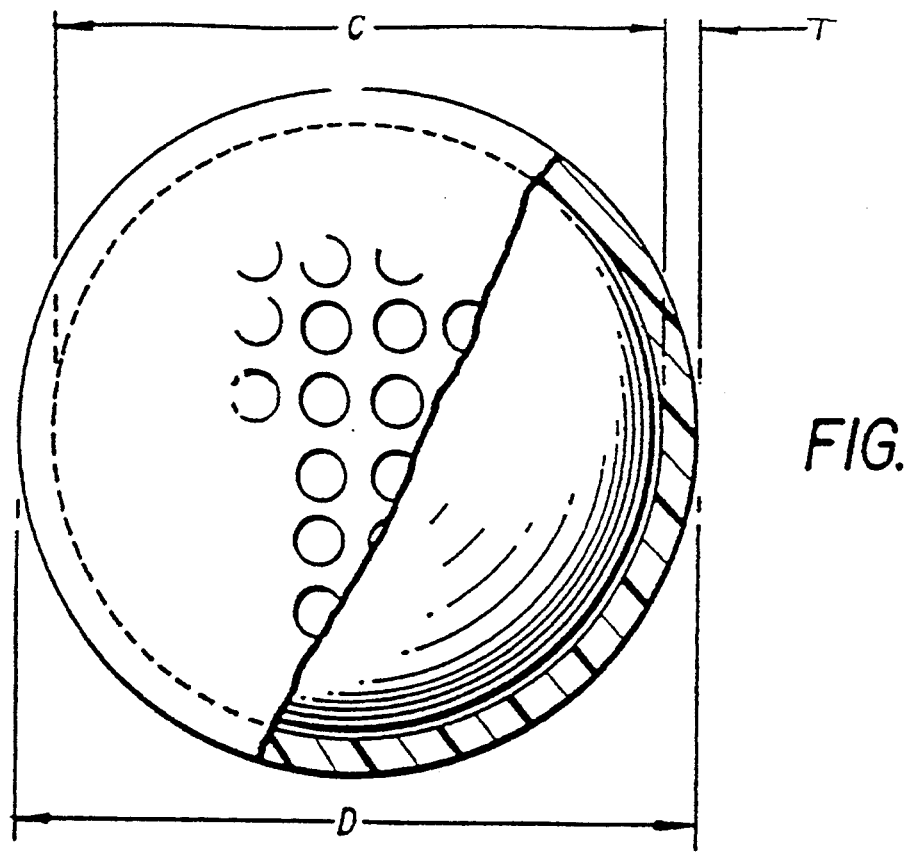
FIG. 1 illustrates a partially broken-away view of the improved golf ball of the present invention wherein D is the diameter of the ball; C is the diameter of the core and T is the thickness of the cover.

The present invention is directed to improved golf balls having a low rate of spin upon club impact. The golf balls comprise a soft polybutadiene core and a hard cover. The hard cover is preferably sized to be larger than conventional diameters. The low spin rate enables the ball to travel a greater distance. In addition, the low spin rate provides the less skilled golfer with more control. This is because the low spin rate decreases undesirable side spin which leads to slicing and hooking. The combination of a hard cover and a soft core provides for a ball having a lower than anticipated spin rate while maintaining high resilience and good durability.

The golf ball comprises a core and a cover. The core has a Riehle compression of at least 0.075, preferably 0.075 to about 0.115, and a PGA compression of about 45 to 85. The cover has a Shore D hardness of at least 65.

In an alternative embodiment, the resulting ball is larger than the standard 1.680 inch golf ball (see FIG. 1). Its diameter is in the range of about 1.680 to 1.800 inches, more likely in the range of about 1.700 to 1.800 inches, preferably in the range of 1.710–1.730 inches, and most preferably in the range of about 1.717–1.720 inches. The larger diameter of the golf ball results from the cover thickness which ranges from more than the standard 0.0675 inches up to about 0.130, preferably from about 0.0675 to about 0.1275 inches, more preferably in the range of about 0.0825 to 0.0925, and most preferably in the range of about 0.0860 to 0.0890 inches. The core is of a standard size, roughly about 1.540 to 1.545 inches.

The core used in the present invention is a specially produced softened polybutadiene elastomeric solid core having a conventional diameter of about 1.540 to 1.545 inches. The core is produced from a composition comprising a base elastomer selected from polybutadiene and mixtures of polybutadiene with other elastomers, at least one metallic salt of an unsaturated carboxylic acid (a co-crosslinking agent), and free radical initiator (a co-crosslinking agent). In addition, a suitable and compatible modifying ingredient including, but not limited to metal activators, fatty acids, fillers, polypropylene powder and other additives may be included.

Of particular concern, only a limited amount of the metallic salt of an unsaturated carboxylic acid is included in the core compositions in order to produce the degree of core softness and weight desired. In this regard, it is understood that when a larger overall ball is desired, the composition of the core is adjusted so that the molded finished ball falls within the weight parameters set forth by the U.S.G.A. Since the finished golf balls must still meet the U.S.G.A. weight limitation of 1.620 ounces, the core component of the larger and thicker covered balls are designed to be not only softer, but also lighter in weight.

In such circumstances, the specific gravity of the core is less than that of a standard core since the larger ball must weigh the same as a standard ball. The core generally weighs about 36 to 37 grams for an standard sized finished ball and about 33 to 34 grams for an oversized finished ball.

The core composition produces a softer molded core which still maintains the resilience (C.O.R.), compression (hardness) and durability characteristics required. The overall molded core has a PGA compression of about 45 to 85, preferably in the range of about 70–80. Its Riehle compression is about 0.075 or more, preferably in the range of 0.075 to 0.115, and the resilience of the core is about 0.760 to 0.780.

The cover is preferably comprised of a hard, high-stiffness ionomer resin, most preferably a metal cation neutralized high acid ionomer resin containing more than 16% carboxylic acid by weight, or blend thereof. The cover has a Shore D hardness of about 65 or greater.

With respect to the ionomeric cover composition of the invention, ionomeric resins are polymers containing interchain ionic bonding. As a result of their toughness, durability, and flight characteristics, various ionomeric resins sold by E. I. DuPont de Nemours & Company under the trademark "Surlyn ®" and more recently, by the Exxon Corporation (see U.S. Pat. No. 4,911,451) under the trademark "Escor ®" and the tradename "Iotek", have become the materials of choice for the construction of golf ball covers over the traditional "balata" (trans-polyisoprene, natural or synthetic) rubbers.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e., improved durability, etc. for golf ball construction over balata.

The ionomeric resins utilized to produce cover compositions can be formulated according to known procedures such as those set forth in U.S. Pat. No. 3,421,766 or British Patent No. 963,380, with neutralization effected according to procedures disclosed in Canadian Patent Nos. 674,595 and 713,631, wherein the ionomer is produced by copolymerizing the olefin and carboxylic acid to produce a copolymer having the acid units randomly distributed along the polymer chain. Broadly, the ionic copolymer generally comprises one or more $\alpha$-olefins and from about 9 to about 20 weight percent of $\alpha, \beta$-ethylenically unsaturated mono- or dicarboxylic acid, the basic copolymer neutralized with metal ions to the extent desired.

At least about 20% of the carboxylic acid groups of the copolymer are neutralized by the metal ions (such as sodium, potassium, zinc, calcium, magnesium, and the like) and exist in the ionic state. Suitable olefins for use in preparing the ionomeric resins include ethylene, propylene, butene-1, hexene-1 and the like. Unsaturated carboxylic acids include acrylic, methacrylic, ethacrylic, $\alpha$-chloroacrylic, crotonic, maleic, fumaric, itaconic acids, and the like. The ionomeric resins utilized in the golf ball industry are generally copolymers of ethylene with acrylic (i.e., Escor ®) and/or methacrylic (i.e., Surlyn ®) acid. In addition, two or more types of ionomeric resins may be blended in to the cover compositions in order to produce the desired properties of the resulting golf balls.

The cover compositions which may be used in making the golf balls of the present invention are set forth in detail but not limited to those in copending U.S. Ser. No. 07/776,803 filed Oct. 15, 1991, and Ser. No. 07/901,660 filed Jun. 19, 1992, both incorporated herein by reference. In short, the cover material is comprised of hard, high stiffness ionomer resins, preferably containing relatively high amounts of acid (i.e., greater than 16 weight percent acid, preferably from about 17 to about 25 weight percent acid, and more preferably from about 18.5 to about 21.5 weight percent) and at least partially neutralized with metal ions (such as sodium, zinc, potassium, calcium, magnesium and the like). The high acid resins are blended and melt processed to produce compositions exhibiting enhanced hardness and coefficient of restitution values when compared to low acid ionomers, or blends of low acid ionomer resins containing 16 weight percent acid or less.

The preferred cover compositions are made from specific blends of two or more high acid ionomers with other cover additives which do not exhibit the processing, playability, distance and/or durability limitations demonstrated by the prior art. However, as more particularly indicated below, the cover composition can also be comprised of one or more low acid ionomers so long as the molded covers exhibit a hardness of 65 or more on the Shore D scale.

Through the use of the softer cores and the hard cover, overall finished balls of the invention exhibit significantly lower spin rates than conventional balls of equal size and weight. Further, reduction in spin are also produced by increasing the thickness of the cover and by decreasing the weight of the softened core.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE INVENTION

The present invention relates to the development of a golf ball having a low spin rate as a result of combining a relatively soft core and a hard cover. Such a lower spin rate after club impact contributes to straighter shots when the ball is mis-hit, greater efficiency in flight, and a lesser degree of energy loss on impact with the ground, adding increased roll or distance. In addition, by increasing the diameter of the overall ball of the present invention beyond the U.S.G.A. minimum of 1.680 inches, the spin rate is still further decreased by up to around 500 r.p.m. or more upon being hit with a No. 9 iron travelling at a speed of 105 feet per second (fps). In this embodiment of the invention, the ball, even though of larger diameter, uses substantially the same size core as a standard golf ball, the difference in size is provided by the additional thickness in the cover of the ball. This larger, low spin ball produces even greater control and flight efficiency than the standard size ball embodiment of the present invention.

Notwithstanding the overall size differences of the various embodiments of the present invention, the core of the present invention is relatively soft and of similar size. It has a Riehle compression of about 0.075 or more, preferably about 0.075 to about 0.115, and a relatively low PGA compression of about 40 to 85, preferably about 70–80.

The specially produced core compositions and resulting molded cores of the present invention are manufactured using relatively conventional techniques. In this regard, the core compositions of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed. Along this line, it has been found that the high cis-polybutadiene manufactured and sold by Shell Chemical Co., Houston, Tex., under the tradename Cariflex BR-1220, and the polyisoprene available from Muehlstein, H & Co., Greenwich, Conn. under the designation "SKI 35" are particularly well suited.

The unsaturated carboxylic acid component of the core composition (a co-crosslinking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 25, and preferably from about 17 to about 21 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are Luperco 230 or 231 XL sold by Atochem, Lucidol Division, Buffalo, N.Y., and Trigonox 17/40 or 29/40 sold by Akzo Chemie America, Chicago, Ill. In this regard Luperco 230 XL and Trigonox 17/40 are comprised of n-butyl 4,4-bis (butylperoxy) valerate; and, Luperco 231 XL and Trigonox 29/40 are comprised of 1,1-bis(t-butylperoxy-3,3,5-trimethyl cyclohexane. The one hour half life of Luperco 231 XL is about 112° C., and the one hour half life of Trigonox 29/40 is about 129° C.

The core compositions of the present invention may additionally contain any other suitable and compatible modifying ingredients including, but not limited to, metal oxides, fatty acids, and diisocyanates and polypropylene powder resin. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is too hard (i.e. exhibits low compression) and thus allows for a reduction in the amount of crosslinking agent utilized to soften the core to a normal or below normal compression.

Furthermore, because polypropylene powder resin can be added to core composition without an increase in weight of the molded core upon curing, the addition of the polypropylene powder allows for the addition of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, filler-reinforcement agents may be added to the composition of the present invention. Since the specific gravity of polypropylene powder is very low, and when compounded, the polypropylene powder produces a lighter molded core, when polypropylene is incorporated in the core compositions, relatively large amounts of higher gravity fillers may be added so long as the specific core weight limitations are met. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. However, if thicker cover compositions are to be applied to the core to produce larger than normal (i.e. greater than 1.680 inches in diameter) balls, use of such fillers and modifying agents will be limited in order to meet the U.S.G.A. maximum weight limitations of 1.620 ounces. Exemplary fillers include mineral fillers such as limestone, silica, micabarytes, calcium carbonate, or clays. Limestone is ground calcium/magnesium carbonate and is used because it is an inexpensive, heavy filler.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention are generally comprised of 100 parts by weight of a base elastomer (or rubber) selected from polybutadiene and mixtures of polybutadiene with other elastomers, 15 to 25 parts by weight of at least one metallic salt of an unsaturated carboxylic acid, and 1 to 10 parts by weight of a free radical initiator.

As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the U.S.-G.A. weight limit of 1.620 ounces.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a Banbury mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell preformer and slugs are produced. The slugs are then subjected to compression molding at about 320° F. for about 14 minutes. After molding, the molded cores are cooled, the cooling effected at room temperature for about 4 hours or in cold water for about one hour. The molded cores are subjected to a centerless grinding operation whereby a thin layer of the molded core is removed to produce a round core having a diameter of 1.540 to 1.545 inches. Alternatively, the cores are used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The core is converted into a golf ball by providing at least one layer of covering material thereon, ranging in thickness from about 0.070 to about 0.130 inches and preferably from about 0.0675 to about 0.1275 inches.

The cover has a Shore D hardness of 65 or greater. Its composition includes a hard, high stiffness preferably high acid ionomer such as that sold by E.I. DuPont de Nemours & Company under the trademark "Surlyn ®" and by Exxon Corporation under the trademark "Escor ®" or tradename "Iotek", or blends thereof. In addition to the Surlyn ® and Escor ® or Iotek ionomers, the cover may comprise any ionomer which either alone or in combination with other ionomers produces a molded cover having a Shore D hardness of at least 65. These include lithium ionomers or blends of ionomers with harder non-ionic polymers such as nylon, polyphenylene oxide and other compatible thermoplastics. As briefly mentioned above, examples of cover compositions which may be used are set forth in detail in copending U.S. Ser. No. 07/776,803 filed Oct. 15, 1991, and Ser. No. 07/901,660 filed Jun. 19, 1992, both incorporated herein by reference. Of course, the cover compositions are not limited in any way to those compositions set forth in said copending applications.

The high acid ionomers suitable for use in the present invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins included in the cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the cover composition preferably includes a high acid ionomeric resin and the scope of the patent embraces all known high acid ionomeric resins falling within the parameters set forth above, only a relatively limited number of these high acid ionomeric resins are currently available. In this regard, the high acid ionomeric resins available from E.I. DuPont de Nemours Company under the trademark "Surlyn ®", and the high acid ionomer resins available from Exxon Corporation under the trademark "Escor ®" or tradename "Iotek" are examples of available high acid ionomeric resins which may be utilized in the present invention.

The high acid ionomeric resins available from Exxon under the designation "Escor ®" and or "Iotek", are somewhat similar to the high acid ionomeric resins available under the "Surlyn ®" trademark. However, since the Escor ®/Iotek ionomeric resins are sodium or zinc salts of poly(ethylene acrylic acid) and the "Surlyn ®" resins are zinc, sodium, magnesium, etc. salts of poly(ethylene methacrylic acid), distinct differences in properties exist.

Examples of the high acid methacrylic acid based ionomers found suitable for use in accordance with this invention include Surlyn ® AD-8422 (sodium cation), Surlyn ® 8162 (zinc cation), Surlyn ® SEP-503-1 (zinc cation), and Surlyn ® SEP-503-2 (magnesium cation). According to DuPont, all of these ionomers contain from about 18.5 to about 21.5% by weight methacrylic acid.

More particularly, Surlyn ® AD-8422 is currently commercially available from DuPont in a number of different grades (i.e., AD-8422-2, AD-8422-3, AD-8422-5, etc.) based upon differences in melt index. According to DuPont, Surlyn ® AD-8422 offers the following general properties when compared to Surlyn ® 8920 the stiffest, hardest of all on the low acid grades (referred to as "hard" ionomers in U.S. Pat. No. 4,884,814):

|  | LOW ACID (15 wt % Acid) | HIGH ACID (>20 wt % Acid) | |
| --- | --- | --- | --- |
|  | SURLYN ® 8920 | SURLYN ® 8422-2 | SURLYN ® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP[1], °C. | 88 | 86 | 85 |
| FP, °C. | 47 | 48.5 | 45 |
| COMPRESSION MOLDING[2] |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, −3 were homogenized at 190° C. before molding.

In comparing Surlyn ® 8920 to Surlyn ® 8422-2 and Surlyn ® 8422-3, it is noted that the high acid Surlyn ® 8422-2 and 8422-3 ionomers have a higher tensile yield, lower elongation, slightly higher Shore D hardness and much higher flexural modulus. Surlyn ® 8920 contains 15 weight percent methacrylic acid and is 59% neutralized with sodium.

In addition, Surlyn ® SEP-503-1 (zinc cation) and Surlyn ® SEP-503-2 (magnesium cation) are high acid zinc and magnesium versions of the Surlyn ® AD 8422 high acid ionomers. When compared to the Surlyn ® AD 8422 high acid ionomers, the Surlyn SEP-503-1 and SEP-503-2 ionomers can be defined as follows:

| Surlyn ® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn ® 8162 is a zinc cation ionomer resin containing approximately 20% by weight (i.e. 18.5-21.5% weight) methacrylic acid copolymer that has been 30-70% neutralized. Surlyn ® 8162 is currently commercially available from DuPont.

Examples of the high acid acrylic acid based ionomers suitable for use in the present invention include the Escor ® or Iotek high acid ethylene acrylic acid ionomers produced by Exxon. In this regard, Escor ® or Iotek 959 is a sodium ion neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

| PROPERTY | ESCOR ® (IOTEK) 959 | ESCOR ® (IOTEK) 960 |
|---|---|---|
| Melt Index, g/10 min | 2.0 | 1.8 |
| Caiton | Sodium | Zinc |
| Melting Point, °F. | 172 | 174 |
| Vicat Softening Point, °F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, as a result of the development by the inventors of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce cover compositions exhibiting enhanced hardness and resilience due to synergies which occur during processing. Consequently, the metal cation neutralized high acid ionomer resins recently produced can be blended to produce substantially harder covered golf balls having higher C.O.R.'s than those produced by the low acid ionomer covers presently commercially available.

More particularly, several new metal cation neutralized high acid ionomer resins have been produced by the inventors by neutralizing, to various extents, high acid copolymers of an alpha-olefin and an alpha, beta-unsaturated carboxylic acid with a wide variety of different metal cation salts. This discovery is the subject matter of U.S. application Ser. No. 901,680, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 1.

TABLE 1

| | Typical Properties of Primacor Ethylene-Acrylic Acid Copolymers | | | | | | |
|---|---|---|---|---|---|---|---|
| GRADE | PERCENT ACID | DENSITY, g/cc | MELT INDEX, g/10 min | TENSILE YD. ST (psi) | FLEXURAL MODULUS (psi) | VICAT SOFT PT (°C.) | SHORE D HARDNESS |
| ASTM | | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |

TABLE 1-continued

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (°C.) | SHORE D HARDNESS |
|---|---|---|---|---|---|---|---|
| 5983 | 20.0 | 0.958 | 500.0 | 850 | 3100 | 44 | 45 |
| 5991 | 20.0 | 0.953 | 2600.0 | 635 | 2600 | 38 | 40 |

[1] The Melt Index values are obtained according to ASTM D-1328, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 2, more specifically in Example 1 in U.S. application Ser. No. 901,680, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 2

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |
| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Controls:
50/50 Blend of Ioteks 8000/7030 C.O.R. = .810/65 Shore D Hardness
Dupont High Acid Surlyn ® 8422 (Na) C.O.R. = .811/70 Shore D Hardness
Dupont High Acid Surlyn ® 8162 (Zn) C.O.R. = .807/65 Shore D Hardness
Exxon High Acid Iotek EX-960 (Zn) C.O.R. = .796/65 Shore D Hardness
Control for Formulations 23-26 is 50/50 Iotek 8000/7030, C.O.R. = .814, Formulation 26 C.O.R. was normalized to that control accordingly
Control for Formulation Nos. 27-30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field golf ball manufacturing.

When utilized in golf ball cover construction, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, and the recently produced high acid blends disclosed in U.S. application Ser. No. 776,803.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for golf ball production. By using these high acid ionomer resins harder, stiffer golf balls having higher C.O.R.s, and thus longer distance, can be obtained.

As will be further noted in the Examples below, other ionomer resins may be used in the cover compositions, such as low acid ionomer resins, so long as the molded cover produces a Shore D hardness of 65 or more. Properties of some of these low acid ionomer resins are provided in the following table:

in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

| Typical Properties of Low Acid Escor ® (Iotek) Ionomers | | | | | | |
|---|---|---|---|---|---|---|
| Resin Properties | ASTM Method | Units | 4000 | 4010 | 8000 | 8020 |
| Cation type | | | zinc | zinc | sodium | sodium |
| Melt index | D-1238 | g/10 min. | 2.5 | 1.5 | 0.8 | 1.6 |
| Density | D-1505 | kg/m³ | 963 | 963 | 954 | 960 |
| Melting Point | D-3417 | °C. | 90 | 90 | 90 | 87.5 |
| Crystallization Point | D-3417 | °C. | 62 | 64 | 56 | 53 |
| Vicat Softening Point | D-1525 | °C. | 62 | 63 | 61 | 64 |
| % Weight Acrylic Acid | | | 16 | — | 11 | — |
| % of Acid Groups Cation Neutralized (3 mm thick, compression molded) | | | 30 | — | 40 | — |
| Tensile at Break | D-638 | MPa | 24 | 26 | 36 | 31.5 |
| Yield point | D-638 | MPa | none | none | 21 | 21 |
| Elongation at break | D-638 | % | 395 | 420 | 350 | 410 |
| 1% Secant modulus | D-638 | MPa | 160 | 160 | 300 | 350 |
| Shore Hardness D | D-2240 | — | 55 | 55 | 61 | 58 |
| Resin Properties | ASTM Method | Units | 8030 | 7010 | 7020 | 7030 |
| Cation type | | | sodium | zinc | zinc | zinc |
| Melt Index | D-1238 | g/10 min. | 2.8 | 0.8 | 1.5 | 2.5 |
| Density | D-1505 | kg/m³ | 960 | 960 | 960 | 960 |
| Melting Point | D-3417 | °C. | 87.5 | 90 | 90 | 90 |
| Crystallization Point | D-3417 | °C. | 55 | — | — | — |
| Vicat Softening Point | D-1525 | °C. | 67 | 60 | 63 | 62.5 |
| % Weight Acrylic Acid | | | — | — | — | — |
| % of Acid Groups Cation Neutralized (3 mm thick, compression molded) | | | — | — | — | — |
| Tensile at Break | D-638 | MPa | 28 | 38 | 38 | 38 |
| Yield Point | D-638 | MPa | 23 | none | none | |
| Elongation at Break | D-638 | % | 395 | 500 | 420 | 395 |
| 1% Secant modulus | D-638 | MPa | 390 | — | — | — |
| Shore Hardness D | D-2240 | — | 59 | 57 | 55 | 55 |

In addition to the above noted ionomers, compatible additive materials may also be added to produce the cover compositions of the present invention. These additive materials include dyes (for example, Ultramarine Blue sold by Whitaker, Clark, and Daniels of South Painsfield, N.J), and pigments, i.e. white pigments such as titanium dioxide (for example Unitane 0–110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardsley, N.Y. Uvitex OB thought to be 2,5-Bis(5-tert-butyl-2-benzoxazoyl)-thiophene. Examples of other optical brighteners suitable for use in accordance with this invention are as follows: Leucopure EGM as sold by Sandoz, East Hanover, N.J. 07936. Leucopure EGM is thought to be 7-(2n-naphthol(1,2-d)-triazol-2yl)3phenyl-coumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis(-benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The above cover compositions, when processed according to the parameters set forth below and combined with soft cores at thicknesses defined herein to produce covers having a Shore D hardness of 65, provide golf balls with reduced spin ratio. It is noted, however, that the high acid ionomer resins provide for more significant reduction in spin rate than that observed for the low acid ionomer resins.

The cover compositions and molded balls of the present invention may be produced according to conventional melt blending procedures. In this regard, the ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about the soft polybutadiene cores to produce a golf ball having a diameter of about 1.680 inches or greater and weighing about 1.620 ounces. In an additional embodiment of the invention, larger molds are utilized to produce the thicker covered oversized golf balls.

As indicated, the golf balls of the present invention can be produced by forming covers consisting of the compositions of the invention around the softer polybutadiene cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200°–300° F. for 2–10 minutes, followed by cooling at 50°–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° to about 100° F. After molding the golf balls produced may undergo various further finishing steps such as buffing, painting, and marking as disclosed in U.S. Pat. No. 4,911,451.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLE 1

Using the ingredients tabled below, golf ball cores having a finished diameter of about 1.540 to about 1.545 inches were produced by compression molding and subsequent removal of a surface layer by grinding. Each core was formulated using 100 parts elastomer (rubber). In the formulations, the amounts of remaining ingredients are expressed in parts by weight, and the weight, degrees of coefficient of restitution and compression (both Riehle and PGA) achieved are set forth below. The data for these examples are the averages for twelve cores which were produced for each example. The properties of the molded cores produced from each formulation were measured according to the following parameters:

Riehle compression is a measurement of the deformation of a golf ball in thousandths of inches under a fixed static load of 200 pounds (a Riehle compression of 47 corresponds to a deflection under load of 0.047 inches).

PGA compression is determined by a force applied to a spring (i.e. 80 PGA=80 Riehle; 90 PGA=70 Riehle; and 100 PGA=60 Riehle) and manufactured by Atti Engineering, Union City, N.J.

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured.

The rebound velocity was divided by the forward velocity to give the coefficient of restitution.

The following core formulations were prepared according to the methods set forth above:

| CORE COMPOSITIONS | | | | |
|---|---|---|---|---|
| Ingredients | A | B | C | D |
| BR-1220[1] | 100 | 100 | 100 | 100 |
| Zinc Diacrylate | 18 | 20 | 37 | 26 |
| Ground Flash | 17 | 20 | 20 | 17 |
| Zinc Oxide | 6 | 6 | 6 | 6 |
| Limestone | 7 | 25 | 15 | — |
| Zinc Stearate | 15 | 20 | 20 | 15 |
| 6400 Polypropylene[2] | 10 | — | — | 10 |
| Trigonox 17/40[3] | 1.5 | 1.5 | 1.5 | 1.5 |
| Papi 94[4] | 0.5 | 0.5 | 0.5 | 0.5 |
| Molded Core Properties | A | B | C | D |
| Core Diameter (in.) | 1.541 | 1.542 | 1.543 | 1.542 |
| Weight (grams) | 33.7 | 36.5 | 36.8 | 33.8 |
| Compression (Riehle/PGA) | 87/73 | 83/77 | 64/96 | 774/8 |
| C.O.R. (e) | .773 | .782 | .802 | .787 |

[1]BR-1220 is a polybutadiene manufactured and sold by Shell Chemical Co., Houston, Texas.
[2]6400 P. is a powdered polypropylene available from Amco Chemical Co., Chicago, Illinois.
[3]Trig 17/40 is a peroxide manufactured and sold by Akzo Chemie, Chicago, Illinois (one hour half life is at 129° C.).
[4]Papi 94 is a polymeric diisocynanate available from Dow Chemical Co., Midland, Michigan.

As noted by the above indicated data, core formulations A and B produce softer cores. Formulation A is appropriate for a molded ball having an overall diameter of about 1.720 inches (i.e., 1.717″). It has less filler, hence a lower specific gravity, than formulation B which is appropriate for a smaller ball, one having a diameter of about 1.680 inches. Formulations C and D are for conventional harder cores. Formulation C is slightly heavier and used for a ball having a diameter of about 1.680 inches. Formulation D is used for producing a ball having a diameter of about 1.720 inches (1.717″).

EXAMPLE 2

Cover compositions were produced by blending the following constituents:

| | COVER COMPOSITIONS | | |
|---|---|---|---|
| Ingredients | Cover 1 | Cover 2 | Cover 3 |
| Iotek 8000 | 45.2 | — | 22.6 |
| Iotek 7030 | 45.2 | — | 22.6 |
| Iotek 959 | — | 45.2 | — |
| Iotek 960 | — | 45.2 | — |
| Iotek 7520[1] | — | — | 45.2 |
| White MB[2] | 9.6 | 9.6 | 9.6 |

[1]Iotek 7520 is a relatively soft, low acid, ionomer resin produced by Exxon.
[2]MB = 74.9 wt-% Iotek 7030, 23.8 wt-% TiO$_2$, 0.01 wt-% Unitex OB, 0.002 wt-% ultra marine blue and 300 ppm Santonox R.

Of the three cover formulations provided above, formulation 2 is the hardest. It is comprised of two hard, high acid ionomer resins. Iotek 959 has an acid content of about 19% to 21% and Iotek 960 also has an acid content of about 19 to 21%.

Formulation 3 provides the softest of the three cover formulations and is substantially similar to the formulation used in the TOP-FLITE TOUR EDITION 90 golf ball. Formulation 3 is comprised of Iotek 8000 and Iotek 7030, both hard, low acid ionomers, and Iotek 7520, a soft, low-acid ionomer, in the amounts set forth above.

Formulation 1 provides intermediate hardness, and is essentially the same formulation used in the TOP FLITE XL II ball (see U.S. Pat. No. 4,911,481).

EXAMPLE 3

The cover formulations set forth in Example 2 were injection molded at about 400° F. around cores of formulations A–D in Example 1 in a manner to permit uniform injection of the selected cover composition over each core. Each of the cores had an identical finished diameter of about 1.541–1.543 inches to produce golf balls of approximately 1.720 (1.717) inches (cores A and D) or about 1.680 inches (cores B and C) in diameter. The cover thickness varied between about 0.069 and about 0.088 inches. All materials were molded under essentially identical conditions. The properties of Riehle compression, PGA compression, coefficient of restitution (C.O.R.), barrel durability (100 blows), cover hardness and spin rate were determined. The results are set forth in Table 3 below.

The data for each example represents the average data for one dozen balls produced according to the desired manner. The properties were measured according to the following parameters:

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test D-2240.

The barrel test or barrel durability test involves firing golf balls at 135 ft./sec. (at 72° F.), into a 5-sided container, the walls of which are steel plates that have grooves milled into them to simulate a golf club face. The balls are subjected to 100 to 300 blows and are inspected at regular intervals for breakage (i.e. any signs of cover cracking or delamination). NB=no breakage.

The spin rate of the golf ball was measured by striking the resulting golf balls with a 9-iron wherein the club-head speed is about 105 feet per second and the ball is launched at an angle of 26 to 34 degrees with an initial velocity of about 110–115 feet per second. The spin rate was measured by observing the rotation of the ball in flight using stop action Strobe photography.

TABLE 3

| Ball/Type (Core/Cover) | Ball Size | Riehle Comp. | PGA Comp. | C.O.R. | Barrel Durability (100 blows) | Cover Hardness Shore C/D | Spin Rate #9 Iron (105 fps) |
|---|---|---|---|---|---|---|---|
| A,1 | 1.72 | 62 | 98 | .814 | NB | 96/95 | 7019 |
| A,2 | 1.72 | 59 | 101 | .827 | NB | 97/68 | 6544 |
| A,3 | 1.72 | 65 | 95 | .795 | NB | 87/56 | 8409 |
| B,1 | 1.68 | 61 | 99 | .793 | NB | 95/65 | 7541 |
| B,2 | 1.68 | 57 | 103 | .803 | NB | 97/68 | 6755 |
| B,3 | 1.68 | 62 | 98 | .775 | NB | 97/56 | 8764 |
| C,1 | 1.68 | 49 | 111 | .816 | NB | 95/65 | 7643 |
| C,2 | 1.68 | 47 | 113 | .822 | NB | 97/68 | 6933 |

TABLE 3-continued

| Ball/Type (Core/Cover) | Ball Size | Riehle Comp. | PGA Comp. | C.O.R. | Barrel Durability (100 blows) | Cover Hardness Shore C/D | Spin Rate #9 Iron (105 fps) |
|---|---|---|---|---|---|---|---|
| C,3 | 1.68 | 50 | 110 | .805 | NB | 87/56 | 9231 |
| D,1 | 1.72 | 57 | 103 | .820 | NB | 96/65 | 7285 |
| D,2 | 1.72 | 55 | 105 | .830 | NB | 97/68 | 6816 |
| D,3 | 1.72 | 58 | 102 | .802 | NB | 87/56 | 8578 |

For comparison purposes, the same results are provided for known preexisting golf balls:

| Ball/Type (Core/Cover) | Ball Size | Riehle Comp. | PGA Comp. | C.O.R. | Barrel Durability (100 blows) | Cover Hardness Shore C/D | Spin Rate #9 Iron (105 fps) |
|---|---|---|---|---|---|---|---|
| Titleist Tour 100 | 1.68 | 73 | 87 | .792 | NB | 83/51 | 9676 |
| Tour Edition 100 | 1.68 | 58 | 102 | .802 | NB | 85/53 | 9961 |
| Tour Edition 90 | 1.68 | 56 | 104 | .802 | NB | 87/56 | 9621 |
| Top-Flite XL II | 1.68 | 51 | 109 | .810 | NB | 95/65 | 7163 |

Molded ball spin test results show that notwithstanding differences in ball size, the combination of a soft core (cores A and B) with a hard cover (cover formulations 1 and 2) minimizes spin rate. Even in the instance where harder cores are used (cores C and D) the golf ball with the hardest cover formulation tested (formulation 2) provides for golf balls having the lowest spin rate.

Further reduction in spin rate is observed through the use of a soft core (core A and B) with the hardest cover (cover formulation 2), with the largest reduction in spin rate observed through the use of the softest core (core A) with the hardest cover (cover formulation 2).

It should be further noted that increased diameter provides for lower spin rates. In comparing balls A,1-3 with corresponding balls B,1-3, the balls having the larger diameter (A,1-3) are lower in spin than balls B,1-3, respectively. The C.O.R. and compression are controlled mainly by the core formulation, with a hard fast core giving a harder, faster ball.

As ball diameter increases upon increasing the cover thickness (core diameter remains the same), the thicker cover (0.0888 versus 0.0690 inches) provides for significant C.O.R. pick-up from center to ball. Further, the increased cover thickness plays a role in added spin reduction observed for the larger balls.

With attention still focused on the tabulated results, the combination of a soft core with a hard cover gives the lowest spin. In comparing ball A,2 to ball D,2 (both at 1.72 inches in diameter) it is seen that the softer core A contributes to lower spin rates. Combination A,2 (softer core, hardest cover) provides the lowest spin rate for the entire test. These same trends hold for the smaller balls, i.e. ball B,2 is lower in spin that ball C,2. While ball B,2 is the lowest spin among the 1.68 inch balls, its spin rate is not as low as ball A,2 which has a larger diameter. This is believed to be attributed to the differences in cover thickness.

The invention has been described with reference to the preferred embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

Having thus described the invention, it is claimed:

1. A golf ball, comprising:
    a core comprising a diene polymer having a Riehle compression of at least 0.075; and
    a cover comprising an ionomer resin and having a Shore D hardness of at least 65, and the spin rate of said golf ball being not greater than 7,643 revolutions per minute when struck with a No. 9 iron at a head speed of 105 feet per second and a launch angle of 26 to 34 degrees.

2. A golf ball, as set forth in claim 1, wherein the cover has a thickness greater than 0.0675 inches.

3. A golf ball, as set forth in claim 1, wherein the cover has a thickness of 0.675 to 0.130 inches.

4. A golf ball, as set forth in claim 1, wherein the golf ball has a diameter of 1.680 to about 1.800 inches.

5. A golf ball, as set forth in claim 1, wherein the golf ball has a diameter of 1.700–1.800 inches.

6. A golf ball, as set forth in claim 1, wherein the golf ball has a diameter of 1.710–1.730 inches.

7. A golf ball, as set forth in claim 1, wherein the golf ball has a diameter of 1.717–1.720 inches.

8. A molded golf ball comprising a core comprising a diene polymer and a cover comprising an ionomer resin and wherein said core has a Riehle compression of 0.075 to 0.115, and wherein said cover has a shore D hardness of at least 65 and a thickness of 0.0675 to 0.130 inches, and the spin rate of said golf ball being not greater than 7,643 revolutions per minute when struck with a No. 9 iron at a head speed of 105 feet per second and a launch angle of 26 to 34 degrees.

9. A molded golf ball, as set forth in claim 8, wherein the core has a Riehle compression of 0.080 to about 0.090, and a diameter of 1.540–1.545 inches.

10. A molded golf ball, as set forth in claim 8, wherein the molded golf ball has a diameter of about 1.70–1.80 inches.

11. A molded golf ball, as set forth in claim 8, wherein the molded golf ball has a diameter of 1.710–1.730 inches.

12. A molded golf ball, as set forth in claim 8, wherein the molded golf ball has a diameter of 1.717–1.720 inches.

* * * * *

UNITED STATES PATENT AND TRADEMARK OFFICE
CERTIFICATE OF CORRECTION

PATENT NO. : 5,368,304
DATED : November 29, 1994
INVENTOR(S) : Michael J. Sullivan
R. Dennis Nesbitt It is certified that error appears in the above-indentified patent and that said Letters Patent is hereby corrected as shown below:

Column 21, Line 19 delete "774/8" and replace thereto --74/86--

Column 5 Line 39 delete "4,911,481" and replace thereto --4,911,451--

Column 22, Table 3, column entitled Cover Hardness Shore C/D delete "96/95" and replace thereto --96/65--

Column 22, Table 3, column entitled Cover Hardness Shore C/D delete "97/56" and replace thereto --87/56--

Signed and Sealed this

Twenty-ninth Day of August, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,368,304
DATED : November 29, 1994
INVENTOR(S) : Michael J. Sullivan It is certified that error appears in the above-identified patent and that said Letters Patent is hereby corrected as shown below:

Column 5, line 39, delete "4,911,451" and replace thereto --4,911,481--.

Signed and Sealed this

Twenty-eighth Day of November 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,368,304
DATED : November 29, 1994
INVENTOR(S) : Sullivan et al.

It is certified that error appears in the above-identified patent and that said Letters Patent is hereby corrected as shown below:

Column 22, line 12, delete "4,911,481" and insert therefor --4,911,451--.

Signed and Sealed this

Twentieth Day of April, 1999

Attest:

Q. TODD DICKINSON

*Attesting Officer*   *Acting Commissioner of Patents and Trademarks*